Patented July 20, 1948

2,445,366

UNITED STATES PATENT OFFICE 2,445,366

OPHTHALMIC COMPOSITIONS

George W. Rigby, Wilmington, Del., assignor, by mesne assignments, to the United States of America as represented by the Secretary of War No Drawing. Application October 2, 1945,
Serial No. 619,900

12 Claims. (Cl. 167—59)

This invention relates to therapeutic compositions and more particularly to ophthalmic compositions useful in arsenic therapy.

The compound 2,3-dimercaptopropanol is particularly suited as an antidote for β-chlorovinyldichloroarsine ("lewisite"), and for arsenic poisoning in general. For effective use of this therapeutic agent for such purpose in the treatment of the eyes, the 2,3-dimercaptopropanol must be dispersed in a vehicle which is miscible with the eye fluids and at the same time produces minimum irritancy. For practical purposes, such therapeutic compositions must also possess high chemical stability so that they will remain effective therapeutic agents for significant periods of time.

An object of this invention is to provide more useful therapeutic compositions containing 2,3-dimercaptopropanol than have heretofore been available. A further object is to provide 2,3-dimercaptopropanol ophthalmic compositions having maximum therapeutic efficacy with minimum irritancy. A still further object is to provide such compositions having satisfactory storage stability. More specifically it is an object of this invention to provide compositions comprising 2,3-dimercaptopropanol, a glycol vehicle, boric acid, an antioxidant for the mercaptopropanol and a metal deactivator having the above properties.

These objects are accomplished by the present invention of anhydrous ophthalmic compositions of pH less than 5.5 comprising 2,3-dimercaptopropanol, a glycol vehicle, an antioxidant, and a metal deactivator. These compositions may be in the form of either eye solutions or eye ointments which are, respectively, liquid and solid at ordinary temperatures.

In the practice of one embodiment of the invention, pure 2,3-dimercaptopropanol, obtainable by reaction of sodium hydrosulfide with glycerol dichlorohydrin, is dissolved in the proportions required for therapeutic effectiveness, i. e., from 2 to 10% and preferably from 5 to 6% by weight of the composition, in an anhydrous ethylene glycol solution containing small amounts, e. g., from 0.5 to 2% of the weight of the dimercaptopropanol, of a metal deactivator such as thiamine hydrochloride and of an antioxidant such as ascorbic acid. The resulting liquid solution has a pH of about 4.

In another embodiment of the invention, an ophthalmic ointment is prepared by uniformly blending 2,3-dimercaptopropanol in proportions required for therapeutic effectiveness with a molten mixture of ethylene glycol and a quantity of polyethylene oxides sufficient to produce a vehicle which is solid at room temperature. Small amounts, e. g., from 0.5 to 2% based on the weight of the dimercaptopropanol, of a metal deactivator such as thiamine hydrochloride and of an antioxidant such as d-isoascorbic acid are added at the same time. The resulting solid ointment has a pH of about 4.5.

The invention is illustrated in greater detail by the following examples in which proportions of ingredients are expressed as parts by weight.

Example I

| | Parts |
|---|---|
| 2,3-dimercaptopropanol | 5.6 |
| Ethylene glycol (containing no more than 0.5 P. P. M. of iron) | 94.4 |
| Thiamine hydrochloride (metal deactivator) | 0.028 |
| d-Isoascorbic acid (antioxidant) | 0.028 |

All the above ingredients are mixed together until a uniform solution is obtained. This composition, when diluted with sufficient distilled water to form a solution containing 1% of 2,3-dimercaptopropanol, has a pH of 3.95. The solution retains 90% of its thiol sulfur during storage for 45 days at 50° C. in a closed glass container, and is useful for arsenic therapy.

Example II

| | Parts |
|---|---|
| 2,3-dimercaptopropanol | 6.0 |
| Ethylene glycol (containing 1.15 P. P. M. of iron) | 94.0 |
| Thiamine hydrochloride (metal (deactivator) | 0.175 |
| Tri-n-butyl phosphite (antioxidant) | 0.01 |

The above ingredients are mixed together until a uniform solution is obtained. This solution, which contains only 1.08 P. P. M. of iron, retains 83.5% of its thiol sulfur after storage in a closed glass container at 50° C. for 61 days. It is useful in arsenic therapy.

Example III

| | Parts |
|---|---|
| 2,3-dimercaptopropanol | 5.6 |
| Ethylene glycol (containing no more than 1 P. P. M. of iron) | 94.4 |
| Ascorbic acid (antioxidant) | 0.028 |
| Thiamine hydrochloride (metal deactivator) | 0.028 |
| Boric acid | 2.00 |

All the above ingredients are mixed together to form a uniform solution, a sample of which, after dilution with sufficient distilled water to give a dimercaptopropanol concentration of 1%, has a pH of 4.08. The anhydrous solution retains 86.1% of its thiol sulfur on storage at 50° C. for 45 days in the presence of air in a closed glass container. It is particularly useful for application to the eyes to neutralize chlorovinyldichloroarsine present therein.

*Example IV*

|  | Parts |
|---|---|
| 2,3-dimercaptopropanol | 5.0 |
| Thiamine hydrochloride (metal deactivator) | 0.05 |
| d-Isoascorbic acid (antioxidant) | 0.05 |
| Boric acid | 2.0 |
| Ethylene glycol (containing no more than 0.5 P. P. M. of iron) | 36.9 |
| Polyethylene oxide (average molecular weight 1500; containing 0.03 P. P. M. of iron) | 48.0 |
| Polyethylene oxide (average molecular weight 4000; containing 0.06 P. P. M. of iron) | 8.0 |

The above ingredients are mixed together and heated gently until a uniform melt is obtained, which is then cooled to room temperature. When diluted with distilled water to a dimercaptopropanol concentration of 1%, this composition has a pH of 4.45. After storage in lead tubes for 4 weeks under conditions where the temperature is changed daily from −40° to +50° C., the anhydrous ointment shows no loss in its dimercaptopropanol content. This solid ointment is suitable for ophthalmic use in the neutralization of arsines, and is particularly suited for application to the eyes as an antidote for β-chlorovinyldichloroarsine.

The examples show the use of several specific antioxidants and metal deactivators in 2,3-dimercaptopropanol ophthalmic compositions. Other antioxidants and metal deactivators which are nonreactive with the dimercaptopropanol may be used instead. For example, other suitable antioxidants include riboflavin, 2-amino-5-ethoxythiophenol, vitamin A, nicotinic acid, p-aminobenzoic acid, diphenylamine, N-phenylol-β-naphthylamine, 2,4-diaminophenol hydrochloride, p-methylaminophenyl sulfate, camphor, and hydrazine hydrochloride. Other suitable metal deactivators include di(n-dodecyl) phosphate, α,α'-dipyridyl, adipic acid, dithiobiuret, dimethylglyoxime, salicylanilide, pinene thiophosphite, phenyldithiobiuret, thiourea, sulfanilamide, and hydroxylamine hydrochloride. The proportions of the antioxidants and of the metal deactivators to be employed in these ophthalmic compositions depend chiefly on the amount of 2,3-dimercaptopropanol present. The metal deactivators are usually employed in proportions ranging from 0.2 to 10% of the weight of the dimercaptopropanol, the preferred proportions being from 0.5 to 2% since larger amounts have only slight additional effectiveness. The antioxidants are usually employed in the same proportions as the metal deactivators, i. e., from 2 to 10% of the weight of the dimercaptopropanol, the preferred proportions likewise being from 0.5 to 2%. The metal deactivator and antioxidant are ordinarily used in equal quantities, but this is not essential.

The invention has been illustrated in the examples with ethylene glycol as the vehicle. However, other glycols, e. g., propylene glycol and butylene glycol, can be employed for this purpose. Likewise thickeners other than the polyethylene oxides of Example IV, e. g., dextrin, may be used.

The 2,3-dimercaptopropanol in these ophthalmic compositions is subject to various types of chemical transformations, such as oxidation to the disulfide and transformation to polymeric sulfides by heating in the absence of oxygen. These transformations are accelerated by the presence of heavy metals, small amounts of which may be present in the ingredients as impurities. Since these transformation products of 2,3-dimercaptopropanol are not effective therapeutic agents, their formation must be prevented or retarded for as long as possible to obtain ophthalmic compositions of greatest utility. The various components of the compositions of this invention have special cooperative relations with each other in producing ophthalmic compositions of greatest utility. Thus, the boric acid offsets changes in pH induced by the glycol and maintains the acidity below pH 5.5, above which the compositions are less stable. In some cases, the boric acid may be omitted provided the antioxidant and metal deactivator employed have sufficient acidity to impart to the final composition a pH of less than 5.5. The metal deactivators act to inhibit the catalytic activity of iron or other heavy metals, such as copper, cobalt and nickel, in promoting the decomposition of the 2,3-dimercaptopropanol. The antioxidants tend to retard the rate of oxidation of the dimercaptopropanol. Finally, since the presence of water accelerates the decomposition of 2,3-dimercaptopropanol in these ophthalmic compositions, it is necessary, in order to obtain compositions of highest stability, to maintain the water content of the composition below about 0.5%. This is accomplished by the use of anhydrous ingredients in formulating the composition.

The ointments and solutions of this invention are of particular value for the neutralization of chlorovinyldichloroarsine in the eyes. They are also of considerable value in arsenic therapy in general.

Having thus described my invention, what I claim as new and wish to secure by Letters Patent is:

1. An anhydrous ophthalmic composition having a pH less than 5.5 comprising 2,3-dimercaptopropanol, an antioxidant for said mercapto compound, thiamine hydrochloride, and a glycol vehicle.

2. An anhydrous ophthalmic composition having a pH less than 5.5 comprising 2,3-dimercaptopropanol, boric acid, an antioxidant for said mercapto compound, thiamine hydrochloride, and a glycol vehicle.

3. An anhydrous ophthalmic composition having a pH less than 5.5 comprising 2,3-dimercaptopropanol, boric acid, an antioxidant for said mercapto compound, thiamine hydrochloride, a glycol vehicle, and a thickening agent.

4. An anhydrous ophthalmic composition having a pH less than 5.5 comprising from 2 to 10% by weight 2,3-dimercaptopropanol, boric acid, an antioxidant for said mercapto compound, thiamine hydrochloride, and a glycol vehicle, said antioxidant and thiamine hydrochloride each being employed in the proportions of from 0.2 to 10% of the weight of said mercapto compound.

5. An anhydrous ophthalmic ointment having a pH of 3.95 comprising in parts by weight:

| | |
|---|---|
| 2,3-dimercaptopropanol | 5.6 |
| Ethylene glycol, containing no more than 0.5 P. P. M. of iron | 94.4 |
| Thiamine hydrochloride | 0.028 |
| d-Isoascorbic acid | 0.028 | and distilled water in amount sufficient to form a solution containing 1% of 2,3-dimercaptopropanol.

6. An anhydrous ophthalmic ointment having a pH of less than 5.5 comprising in parts by weight:

| | |
|---|---|
| 2,3-dimercaptopropanol | 6.0 |
| Ethylene glycol, containing approximately 1.15 P. P. M. of iron | 94.0 |
| Thiamine hydrochloride | 0.175 |
| Tri-n-butyl phosphite | 0.01 |

7. An anhydrous ophthalmic composition having a pH of 4.08 comprising in parts by weight:

| | |
|---|---|
| 2,3-dimercaptopropanol | 5.6 |
| Ethylene glycol, containing no more than 1 P. P. M. of iron | 94.4 |
| Ascorbic acid | 0.028 |
| Thiamine hydrochloride | 0.028 |
| Boric acid | 2.00 | and distilled water in an amount sufficient to form a solution containing 1% of 2,3-dimercaptopropanol.

8. An anhydrous ophthalmic ointment having a pH of 4.45 comprising in parts by weight:

| | |
|---|---|
| 2,3-dimercaptopropanol | 5.0 |
| Thiamine hydrochloride | 0.05 |
| d-Isoascorbic acid | 0.05 |
| Boric acid | 2.0 |
| Ethylene glycol, containing no more than 0.5 P. P. M. of iron | 36.9 |
| Polyethylene oxide, average molecular weight 1500; containing 0.03 P. P. M. of iron | 48.0 |
| Polyethylene oxide, average molecular weight 4000; containing 0.06 P. P. M. of iron | 8.0 | and distilled water in an amount sufficient to form a composition containing 1% of 2,3-dimercaptopropanol.

9. An ophthalmic composition comprising from approximately two per cent to approximately ten per cent of 2,3-dimercaptopropanol, and a vehicle for the 2,3-dimercaptopropanol comprising substantial amounts of ethylene glycol, the composition also including thiamine hydrochloride as a metal deactivator and an ascorbic acid as an antioxidant for 2,3-dimercaptopropanol, the thiamine hydrochloride and the ascorbic acid each being present in amounts of approximately 0.5 per cent to approximately two per cent of the weight of the 2,3-dimercaptopropanol.

10. A substantially anhydrous ophthalmic composition comprising therapeutically effective amounts of 2,3-dimercaptopropanol, a vehicle for the dimercaptopropanol consisting of ethylene glycol and polyethylene oxides in amount sufficient to produce a solid vehicle at room temperature, thiamine hydrochloride as a metal deactivator and ascorbic acid as an anti-oxidant for the 2,3-dimercaptopropanol, the thiamine hydrochloride and the ascorbic acid each being present in amounts of approximately 0.5 per cent to approximately two per cent of the weight of the 2,3-dimercaptopropanol.

11. The process of preparing an ophthalmic composition useful in arsenic therapy, which comprises incorporating therapeutically effective amounts of 2,3-dimercaptopropanol in a vehicle composed essentially of glycols, incorporating in the composition thiamine hydrochloride as a metal deactivator and an ascorbic acid as an antioxidant for the dimercaptopropanol, and proportioning additions of the thiamine chloride and ascorbic acid whereby each will be present in amounts of from approximately 0.5 per cent to approximately two per cent by weight of the 2,3-dimercaptopropanol.

12. The process of preparing an ophthalmic composition useful in arsenic therapy, which comprises uniformly incorporating therapeutically effective amounts of 2,3-dimercaptopropanol in a molten vehicle composed of ethylene glycol and a quantity of polyethylene oxides sufficient to produce a vehicle which is solid at room temperature and simultaneously with the incorporation of the dimercaptopropanol, adding to the molten vehicle thiamine hydrochloride as a metal deactivator and $\alpha$-iso-ascorbic acid as an anti-oxidant for the dimercaptopropanol, the thiamine hydrochloride and the $\alpha$-iso-arcorbic acid each being added in amount of from approximately 0.5 per cent to approximately two per cent of the amount of the dimercaptopropanol employed.

GEORGE W. RIGBY.

REFERENCES CITED

The following references are of record in the file of this patent:

Peters et al., Nature, Nov. 24, 1945, vol. 156, pages 616–619.

Bliss, Drug and Cosmetic Industry, March 1937, vol. 40, No. 3, pages 342–344, 369, 371.